US012675932B2

(12) United States Patent
Bhandaru et al.

(10) Patent No.: US 12,675,932 B2
(45) Date of Patent: Jul. 7, 2026

(54) SYSTEM AND METHOD FOR GENERATING VIDEO CONTENTS OF DIGITAL INTERACTIVE PLATFORMS TO OPTIMIZE USER EXPERIENCE

(71) Applicant: Awone Datasciences Private Limited, Hyderabad (IN)

(72) Inventors: Vamsi Mohan Bhandaru, Hyderabad (IN); Sarabjeet Singh Kochar, Asker (NO)

(73) Assignee: Awone Datasciences Private Limited, Hyderabad (IN)

( * ) Notice: Subject to any disclaimer, the term of this patent is extended or adjusted under 35 U.S.C. 154(b) by 135 days.

(21) Appl. No.: 18/814,771

(22) Filed: Aug. 26, 2024

(65) Prior Publication Data

US 2025/0069311 A1      Feb. 27, 2025

(30) Foreign Application Priority Data

Aug. 24, 2023    (IN) ............................. 202341056802

(51) Int. Cl.
| | |
|---|---|
| *G06T 13/40* | (2011.01) |
| *A63F 13/52* | (2014.01) |
| *G06T 13/80* | (2011.01) |

(52) U.S. Cl.
CPC ............. *G06T 13/40* (2013.01); *A63F 13/52* (2014.09); *G06T 13/80* (2013.01); *G06T 2200/24* (2013.01)

(58) Field of Classification Search
CPC ................................ G06T 13/40; G06T 13/80
See application file for complete search history.

(56) References Cited

U.S. PATENT DOCUMENTS

| | | | |
|---|---|---|---|
| 2010/0141663 A1* | 6/2010 | Becker | .................... G06T 13/40 |
| | | | 715/764 |
| 2011/0007079 A1 | 1/2011 | Perez et al. | |
| 2011/0304629 A1 | 12/2011 | Winchester | |
| 2012/0100915 A1 | 4/2012 | Margalit et al. | |
| 2012/0135804 A1 | 5/2012 | Bender et al. | |
| 2014/0128166 A1 | 5/2014 | Tam et al. | |
| 2022/0168639 A1 | 6/2022 | Nelson et al. | |

(Continued)

FOREIGN PATENT DOCUMENTS

| | | | | |
|---|---|---|---|---|
| CN | 115834967 A | * | 3/2023 | ........... H04N 21/472 |

*Primary Examiner* — Daniel F Hajnik
*Assistant Examiner* — Joshua Jungwook Suo
(74) *Attorney, Agent, or Firm* — Jason C. Cameron

(57) ABSTRACT

A computer-implemented system for generating video contents associated with digital interactive platforms to optimize user experience in digital interactive platforms, is disclosed. The computer-implemented system is configured to: obtain first inputs from user devices of users; obtain second inputs from the user devices of the users; correlate real-time feedback from the users on actions performed by the users during the digital interactive platforms and the current state of the digital interactive platforms, with face expressions assigned to characters in digital interactive platforms; and generate animated media contents in the video contents to optimize user experience in the digital interactive platforms, based on correlation between the real-time feedback from the users on the actions performed by the users during digital interactive platforms and current state of the digital interactive platforms, and face expressions assigned to characters in digital interactive platforms.

14 Claims, 4 Drawing Sheets

100

102

104

Communication network
110

Computer-Implemented System
106

Plurality of Subsystems
108

(56)            References Cited

U.S. PATENT DOCUMENTS

| 2022/0254082 | A1 |  | 8/2022 | Bhat et al. |
|---|---|---|---|---|
| 2022/0258049 | A1 | * | 8/2022 | Kanani .............. G06Q 30/0621 |
| 2024/0214454 | A1 | * | 6/2024 | Singh ..................... G06F 3/011 |

* cited by examiner

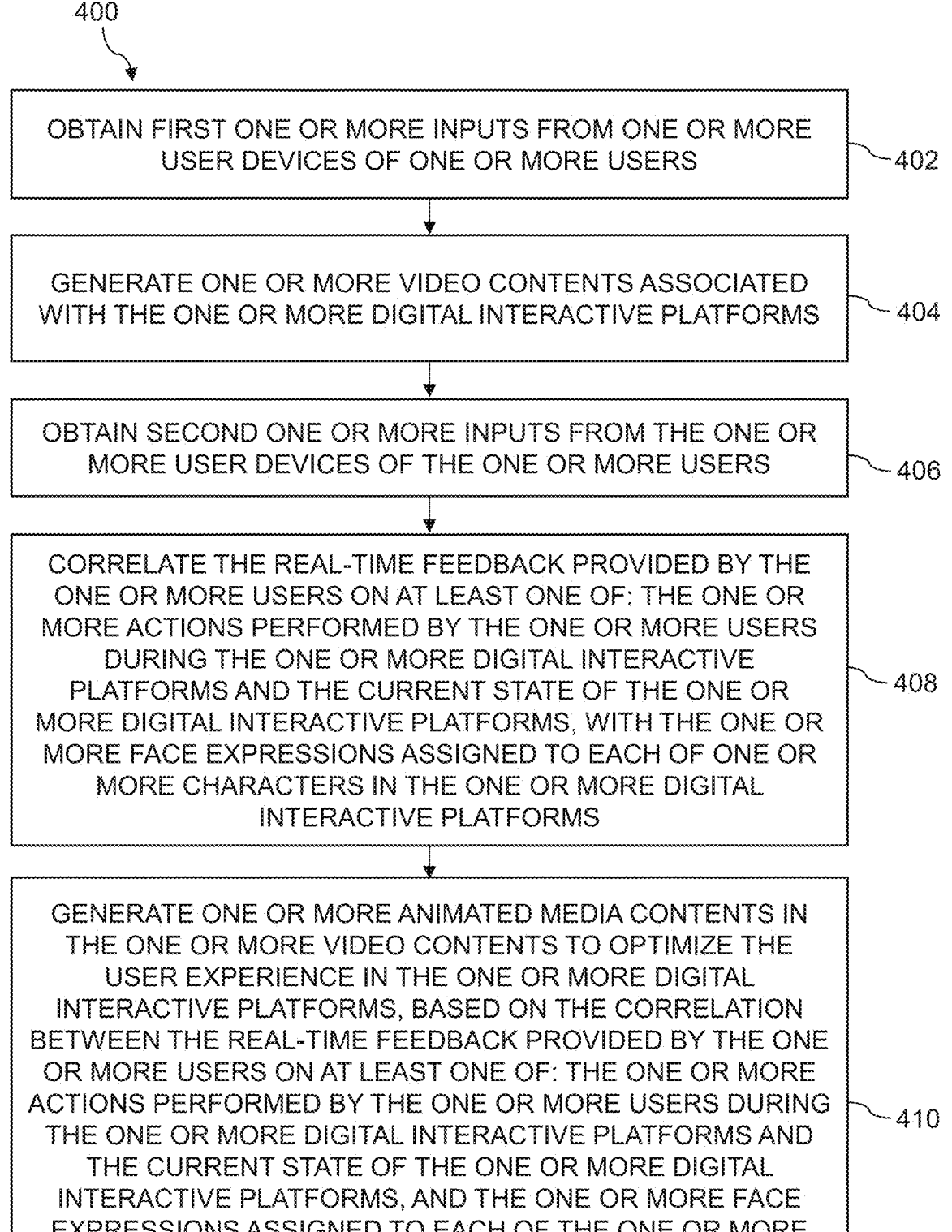

400

OBTAIN FIRST ONE OR MORE INPUTS FROM ONE OR MORE USER DEVICES OF ONE OR MORE USERS ~402

GENERATE ONE OR MORE VIDEO CONTENTS ASSOCIATED WITH THE ONE OR MORE DIGITAL INTERACTIVE PLATFORMS ~404

OBTAIN SECOND ONE OR MORE INPUTS FROM THE ONE OR MORE USER DEVICES OF THE ONE OR MORE USERS ~406

CORRELATE THE REAL-TIME FEEDBACK PROVIDED BY THE ONE OR MORE USERS ON AT LEAST ONE OF: THE ONE OR MORE ACTIONS PERFORMED BY THE ONE OR MORE USERS DURING THE ONE OR MORE DIGITAL INTERACTIVE PLATFORMS AND THE CURRENT STATE OF THE ONE OR MORE DIGITAL INTERACTIVE PLATFORMS, WITH THE ONE OR MORE FACE EXPRESSIONS ASSIGNED TO EACH OF ONE OR MORE CHARACTERS IN THE ONE OR MORE DIGITAL INTERACTIVE PLATFORMS ~408

GENERATE ONE OR MORE ANIMATED MEDIA CONTENTS IN THE ONE OR MORE VIDEO CONTENTS TO OPTIMIZE THE USER EXPERIENCE IN THE ONE OR MORE DIGITAL INTERACTIVE PLATFORMS, BASED ON THE CORRELATION BETWEEN THE REAL-TIME FEEDBACK PROVIDED BY THE ONE OR MORE USERS ON AT LEAST ONE OF: THE ONE OR MORE ACTIONS PERFORMED BY THE ONE OR MORE USERS DURING THE ONE OR MORE DIGITAL INTERACTIVE PLATFORMS AND THE CURRENT STATE OF THE ONE OR MORE DIGITAL INTERACTIVE PLATFORMS, AND THE ONE OR MORE FACE EXPRESSIONS ASSIGNED TO EACH OF THE ONE OR MORE CHARACTERS IN THE ONE OR MORE DIGITAL INTERACTIVE PLATFORMS ~410

FIG. 4

SYSTEM AND METHOD FOR GENERATING VIDEO CONTENTS OF DIGITAL INTERACTIVE PLATFORMS TO OPTIMIZE USER EXPERIENCE

CROSS-REFERENCE TO RELATED APPLICATION(S)

This application claims the priority to incorporate by reference the entire disclosure of Indian Patent Application number 202341056802, filed on Aug. 24, 2023, and titled "SYSTEM AND METHOD FOR GENERATING VIDEO CONTENTS OF DIGITAL INTERACTIVE PLATFORMS TO OPTIMIZE USER EXPERIENCE".

FIELD OF INVENTION

Embodiments of the present disclosure relate to a user engagement system in digital interactive platforms and more particularly relate to a computer-implemented system and method for generating one or more video contents associated with one or more digital interactive platforms to optimize a user experience in one or more digital interactive platforms.

BACKGROUND

Sports and iGaming industry has experienced a significant intersection in recent years, with both sectors benefiting from their collaboration. A merging of sports and iGaming has created new opportunities for entertainment, engagement, and revenue generation. Digital interactive platforms are one of the key aspects of the sports and iGaming industry.

The digital interactive platforms are simulated versions of real sports events that are accessed and bet on through online platforms. These digital interactive platforms simulations use advanced algorithms and graphics to mimic an excitement of live sports. The digital interactive platforms allow fans to experience thrills of sports betting even when there are no real events taking place. The digital interactive platforms with continuous streams create user experience that appeals to iGaming and sports enthusiasts.

Even though, the digital interactive platforms of the sports and iGaming industry helps in experiencing the thrills of activities related to the sports, the sports and iGaming industry has limited or no personalization options for users to have rich personalized experience to guide the users for optional actions or to enhance direct engagement to enjoy a game play.

Therefore, there is a need for an improved system and method for optimizing a user experience in one or more digital interactive platforms, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a computer-implemented system for generating one or more video contents associated with one or more digital interactive platforms to optimize a user experience in the one or more digital interactive platforms, is disclosed. The computer-implemented system includes one or more hardware processors and a memory. The memory is coupled to the one or more hardware processors. The memory comprises a set of program instructions in form of a plurality of subsystems, configured to be executed by the one or more hardware processors. The plurality of subsystems comprises an input obtaining subsystem, and a video content generating subsystem.

The input obtaining subsystem is configured to obtain first one or more inputs from one or more user devices of one or more users. The first one or more inputs obtained from the one or more user devices of the one or more users, comprises first information associated with at least one of: a selection of one or more characters in the one or more digital interactive platforms, and assigning of one or more face expressions to each of the one or more characters in the one or more digital interactive platforms.

The video content generating subsystem is configured to generate the one or more video contents associated with the one or more digital interactive platforms.

The input obtaining subsystem is further configured to obtain second one or more inputs from the one or more user devices of the one or more users. The second one or more inputs comprises second information associated with a real-time feedback provided by the one or more users, on at least one of: one or more actions performed by the one or more users during the one or more digital interactive platforms, and a current state of the one or more digital interactive platforms.

The video content generating subsystem is further configured to correlate the real-time feedback provided by the one or more users on at least one of: the one or more actions performed by the one or more users during the one or more digital interactive platforms and the current state of the one or more digital interactive platforms, with the one or more face expressions assigned to each of the one or more characters in the one or more digital interactive platforms.

The video content generating subsystem is further configured to generate one or more animated media contents in the one or more video contents to optimize the user experience in the one or more digital interactive platforms, based on the correlation between the real-time feedback provided by the one or more users on at least one of: the one or more actions performed by the one or more users during the one or more digital interactive platforms and the current state of the one or more digital interactive platforms, and the one or more face expressions assigned to each of the one or more characters in the one or more digital interactive platforms. The one or more animated media contents comprises at least one of: the one or more face expressions provided by the one or more digital interactive platforms and one or more scenes related to the one or more actions performed by the one or more users.

In an embodiment, the second one or more inputs is obtained from at least one image capturing device configured in the one or more user devices of the one or more users.

In another embodiment, the one or more face expressions provided by the one or more characters is pre-stored in a cloud database. The one or more face expressions provided by the one or more characters is generated as the one or more animated media contents by a machine learning model comprising at least one of: a video-to-video model and a text-to image-model, based on the first one or more inputs obtained from the one or more user devices of the one or more users. The one or more animated media contents comprises a sequence of images of the one or more characters with the one or more face expressions.

In yet another embodiment, in generating the one or more face expressions provided by the one or more characters, the machine learning model is configured to: (a) obtain the first one or more inputs from the one or more user devices of the one or more users, (b) correlate an input text associated with at least one of: the one or more face expressions and the one or more characters to whom the one or more face expressions to be assigned, with predetermined one or more animated media contents associated with one or more face expressions provided by the one or more characters, and (c) generate the one or more face expressions provided by the one or more characters, based on the correlation between the input text associated with at least one of: the one or more face expressions and the one or more characters to whom the one or more face expressions to be assigned, and the predetermined one or more animated media contents associated with the one or more face expressions provided by the one or more characters. In an embodiment, the first one or more inputs comprises the input text associated with at least one of: the one or more face expressions and the one or more characters for assigning the one or more face expressions.

In yet another embodiment, the plurality of subsystems further comprises an event generating subsystem configured to generate at least one logical sub-event corresponding to one or more events associated with one or more user actions, in the one or more video contents, based on historical data associated with the one or more digital interactive platforms. The at least one logical sub-event comprises the one or more animated media contents generated in the one or more video contents.

In yet another embodiment, the event generating subsystem is further configured to combine at least two sub-events corresponding to the one or more events associated with the one or more user actions, in the one or more video contents. The at least two logical sub-events being played upon occurring of the one or more events associated with the one or more actions performed by the one or more users, in the one or more video contents.

In yet another embodiment, the one or more face expressions comprises at least one of: happy, sad, angry, and surprise, provided by the one or more characters based on the real-time feedback provided by the one or more users on at least one of: the one or more actions performed by the one or more users during the one or more digital interactive platforms and the current state of the one or more digital interactive platforms.

In one aspect, a computer-implemented method for generating one or more video contents associated with one or more digital interactive platforms to optimize a user experience in the one or more digital interactive platforms, is disclosed. The computer-implemented method comprises obtaining, by one or more hardware processors, first one or more inputs from one or more user devices of one or more users. In an embodiment, the first one or more inputs obtained from the one or more user devices of the one or more users, comprises first information associated with at least one of: a selection of one or more characters in the one or more digital interactive platforms, and assigning of one or more face expressions to each of the one or more characters in the one or more digital interactive platforms.

The computer-implemented method further comprises generating, by the one or more hardware processors, the one or more video contents associated with the one or more digital interactive platforms.

4

The computer-implemented method further comprises obtaining, by the one or more hardware processors, second one or more inputs from the one or more user devices of the one or more users. In an embodiment, the second one or more inputs comprises second information associated with a real-time feedback provided by the one or more users, on at least one of: one or more actions performed by the one or more users during the one or more digital interactive platforms, and a current state of the one or more digital interactive platforms.

The computer-implemented method further comprises correlating, by the one or more hardware processors, the real-time feedback provided by the one or more users on at least one of: the one or more actions performed by the one or more users during the one or more digital interactive platforms and the current state of the one or more digital interactive platforms, with the one or more face expressions assigned to each of the one or more characters in the one or more digital interactive platforms.

The computer-implemented method further comprises generating, by the one or more hardware processors, one or more animated media contents in the one or more video contents to optimize the user experience in the one or more digital interactive platforms, based on the correlation between the real-time feedback provided by the one or more users on at least one of: the one or more actions performed by the one or more users during the one or more digital interactive platforms and the current state of the one or more digital interactive platforms, and the one or more face expressions assigned to each of the one or more characters in the one or more digital interactive platforms.

In an embodiment, the one or more animated media contents comprises at least one of: the one or more face expressions provided by the one or more characters and one or more scenes related to the one or more actions performed by the one or more users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4 is a flow chart depicting a computer-implemented method for generating the one or more video contents associated with the one or more digital interactive platforms to optimize the user experience in the one or more digital interactive platforms, in accordance with an embodiment of the present disclosure.

Figure 1:
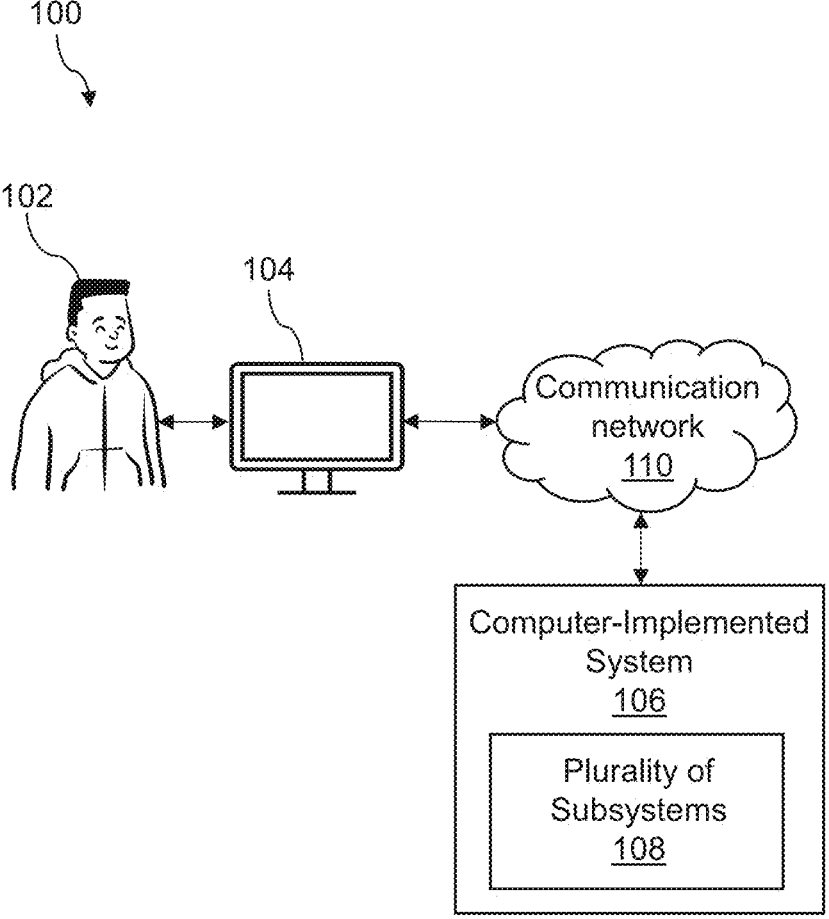
FIG. 1 is a block diagram of a computer-implemented system for generating one or more video contents associated with one or more digital interactive platforms to optimize a user experience in the one or more digital interactive platforms, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram 100 of a computer-implemented system 106 for generating one or more video contents associated with one or more digital interactive platforms to optimize a user experience in the one or more digital interactive platforms, in accordance with an embodiment of the present disclosure. The computer-implemented system 106 is configured to optimize the user experience by dynamic personalization of the one or more video contents associated with the one or more digital interactive platforms. The computer-implemented system 106 is initially configured to obtain first one or more inputs from one or more user devices 104 of one or more users 102.

In an embodiment, the first one or more inputs obtained from the one or more user devices 104 of the one or more users 102, includes first information associated with at least one of: a selection of one or more characters in the one or more digital interactive platforms, and assigning of one or more face expressions to each of the one or more characters in the one or more digital interactive platforms. The computer-implemented system 106 is further configured to generate the one or more video contents associated with the one or more digital interactive platforms.

The computer-implemented system 106 is further configured to obtain second one or more inputs from the one or more user devices 104 of the one or more users 102. In an embodiment, the second one or more inputs includes second information associated with a real-time feedback provided by the one or more users 102, on at least one of: one or more actions performed by the one or more users 102 during the one or more digital interactive platforms, and a current state of the one or more digital interactive platforms.

The computer-implemented system 106 is further configured to correlate the real-time feedback (i.e., the one or more real-time face expressions) provided by the one or more users 102 on at least one of: the one or more actions performed by the one or more users 102 during the one or more digital interactive platforms and the current state of the one or more digital interactive platforms, with the one or more face expressions assigned to each of the one or more characters in the one or more digital interactive platforms.

The computer-implemented system 106 is further configured to generate one or more animated media contents in the one or more video contents to optimize the user experience in the one or more digital interactive platforms, based on the correlation between the real-time feedback provided by the one or more users 102 on at least one of: the one or more actions performed by the one or more users 102 during the one or more digital interactive platforms and the current state of the one or more digital interactive platforms, and the one or more face expressions assigned to each of the one or more characters in the one or more digital interactive platforms. In an embodiment, the one or more animated media contents includes at least one of: the one or more face expressions provided by the one or more characters and one or more scenes (i.e., one or more second video contents) related to the one or more actions performed by the one or more users 102.

In an embodiment, the computer-implemented system 106 may be hosted on a central server including at least one of: a cloud server, a remote server, and the like. In another embodiment, the computer-implemented system 106 as the central server may obtain the one or more inputs from the one or more users 102 and may generate the one or more video contents. The computer-implemented system 106 as the central server may further generate the one or more animated media contents in the one or more video contents to optimize the user experience in the one or more digital interactive platforms, based on above said processes.

In an embodiment, the computer-implemented system 106 may be communicatively connected to the one or more user devices 104 through a communication network 110. The communication network 110 may be at least one of: a Wireless-Fidelity (Wi-Fi) connection, a hotspot connection, a Bluetooth connection, a local area network (LAN), a wide area network (WAN), any other wireless network, and the like.

Figure 2:
FIG. 2 is a detailed view of the computer-implemented system, such as those shown in FIG. 1, in accordance with an embodiment of the present disclosure.
Figure 2:
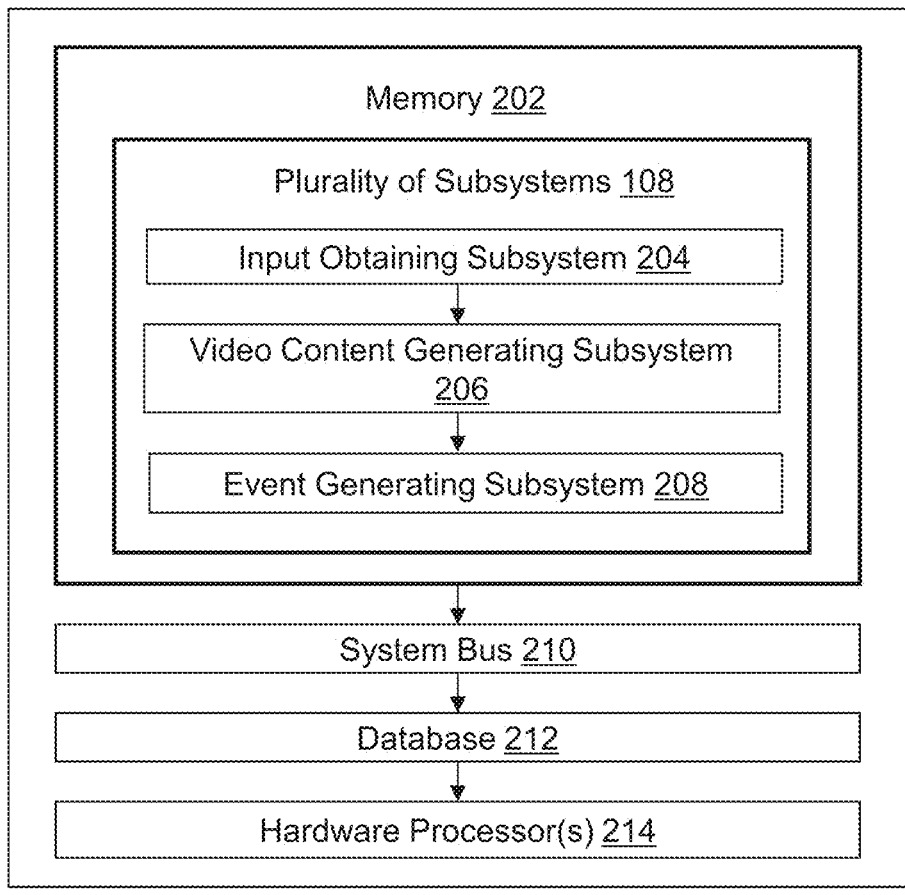

FIG. 2 is a detailed view of the computer-implemented system 106, such as those shown in FIG. 1, in accordance with an embodiment of the present disclosure. The computer-implemented system 106 includes one or more hardware processor(s) 214. The computer-implemented system 106 further includes a memory 202 coupled to the one or more hardware processor(s) 214. The memory 202 includes a set of program instructions in form of the plurality of subsystems 108.

The one or more hardware processor(s) 214, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes the plurality of subsystems 108 stored in the form of executable program which instructs the one or more hardware processor(s) 214 via a system bus 210 to perform the above-mentioned method steps. The plurality of subsystems 108 includes following subsystems: an input obtaining subsystem 204, a video content generating subsystem 206, and an event generating subsystem 208.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the one or more hardware processor(s) 214.

The plurality of subsystems 108 includes the input obtaining subsystem 204 that is communicatively connected to the one or more hardware processor(s) 214. The input obtaining subsystem 204 is configured to obtain the first one or more inputs from one or more user devices 104 of the one or more users 102. In an embodiment, the first one or more inputs obtained from the one or more user devices 104 of the one or more users 102, includes the first information associated with at least one of: the selection of the one or more characters in the one or more digital interactive platforms, and assigning of the one or more face expressions to each of the one or more characters in the one or more digital interactive platforms.

In an embodiment, the one or more face expressions provided by the one or more characters is pre-stored in a cloud database. In another embodiment, the one or more face expressions provided by the one or more characters is generated as the one or more animated media contents by a machine learning model, based on the first one or more inputs obtained from the one or more user devices 104 of the one or more users 102. In an embodiment, the machine learning model may include at least one of: a video-to-video model and a text-to image-model. In an embodiment, the one or more animated media contents includes a sequence of images of the one or more characters with the one or more face expressions.

In an embodiment, for generating the one or more face expressions provided by the one or more characters, the machine learning model is configured to obtain the first one or more inputs from the one or more user devices 104 of the one or more users 102. In an embodiment, the first one or more inputs includes an input text associated with at least one of: the one or more face expressions and the one or more characters for assigning the one or more face expressions.

The machine learning model is further configured to correlate the input text associated with at least one of: the one or more face expressions and the one or more characters to whom the one or more face expressions to be assigned, with predetermined one or more animated media contents associated with one or more face expressions provided by the one or more characters.

The machine learning model is further configured to generate the one or more face expressions provided by the one or more characters, based on the correlation between the input text associated with at least one of: the one or more face expressions and the one or more characters to whom the one or more face expressions to be assigned, and the predetermined one or more animated media contents associated with the one or more face expressions provided by the one or more characters.

The plurality of subsystems 108 further includes the video content generating subsystem 206 that is communicatively connected to the one or more hardware processor(s) 214. The video content generating subsystem 206 is configured to generate the one or more video contents associated with the one or more digital interactive platforms.

The input obtaining subsystem 204 is further configured to obtain the second one or more inputs from the one or more user devices 104 of the one or more users 102. In an embodiment, the second one or more inputs includes the second information associated with the real-time feedback provided by the one or more users 102, on at least one of: one or more actions performed by the one or more users 102 during the one or more digital interactive platforms, and the current state of the one or more digital interactive platforms. In an embodiment, the real-time feedback provided by the one or more users 102 includes one or more real-time face expressions (i.e., emotions) provided by the one or more users 102. In an embodiment, the one or more real-time face expressions includes at least one of: happy, sad, angry, and surprise provided by the one or more users 102 on one or more actions performed by the one or more users 102 during the one or more digital interactive platforms, and the current state of the one or more digital interactive platforms. In an embodiment, the second one or more inputs is obtained from at least one image capturing device configured in the one or more user devices 104 of the one or more users 102.

The video content generating subsystem 206 is further configured to correlate the real-time feedback provided by the one or more users 102 on at least one of: the one or more actions performed by the one or more users 102 during the one or more digital interactive platforms and the current state of the one or more digital interactive platforms, with the one or more face expressions assigned to each of the one or more characters in the one or more digital interactive platforms.

The video content generating subsystem 206 is further configured to generate the one or more animated media contents in the one or more video contents to optimize the user experience in the one or more digital interactive plat-forms, based on the correlation between the real-time feed-back provided by the one or more users 102 on at least one of: the one or more actions performed by the one or more users 102 during the one or more digital interactive plat-forms and the current state of the one or more digital interactive platforms, and the one or more face expressions assigned to each of the one or more characters in the one or more digital interactive platforms.

In an embodiment, one or more animated media contents includes at least one of: the one or more face expressions provided by the one or more characters and one or more scenes (i.e., the second one or more video contents) related to the one or more actions performed by the one or more users 102. In an embodiment, the second one or more video contents is being played along with the one or more video contents for maximizing/optimizing the user experience in the one or more digital interactive platforms.

The plurality of subsystems 108 further includes the event generating subsystem 208 that is communicatively con-nected to the one or more hardware processor(s) 214. The event generating subsystem 208 is configured to generate at least one logical sub-event corresponding to one or more events associated with one or more user actions, in the one or more video contents, based on historical data associated with the one or more digital interactive platforms. In an instance, in a digital interactive cricket platform, a character achieves century after hitting six runs (i.e., the event) and the character celebrates the century by showing a bat (i.e., a logical sub-event associated with the event) to virtual audi-ences in a digital interactive playground, to be played with the one or more video contents associated with the digital interactive cricket platform. In an embodiment, the at least one logical sub-event includes the one or more animated media contents generated in the one or more video contents.

The event generating subsystem 208 is further configured to combine at least two sub-events corresponding to the one or more events associated with the one or more user actions, in the one or more video contents. In an instance, in the digital interactive cricket platform, the character achieves the century after hitting six runs (i.e., the event) and the character celebrates the century by showing the bat (i.e., a first logical sub-event associated with the event) to virtual audiences in a digital interactive playground, and then the character kisses his/her bat (i.e., a second logical sub-event associated with the event), to be played with the one or more video contents associated with the digital interactive cricket platform. In an embodiment, the at least two logical sub-events are played upon occurring of the one or more events associated with the one or more actions performed by the one or more users 102, in the one or more video contents.

Figure 3:
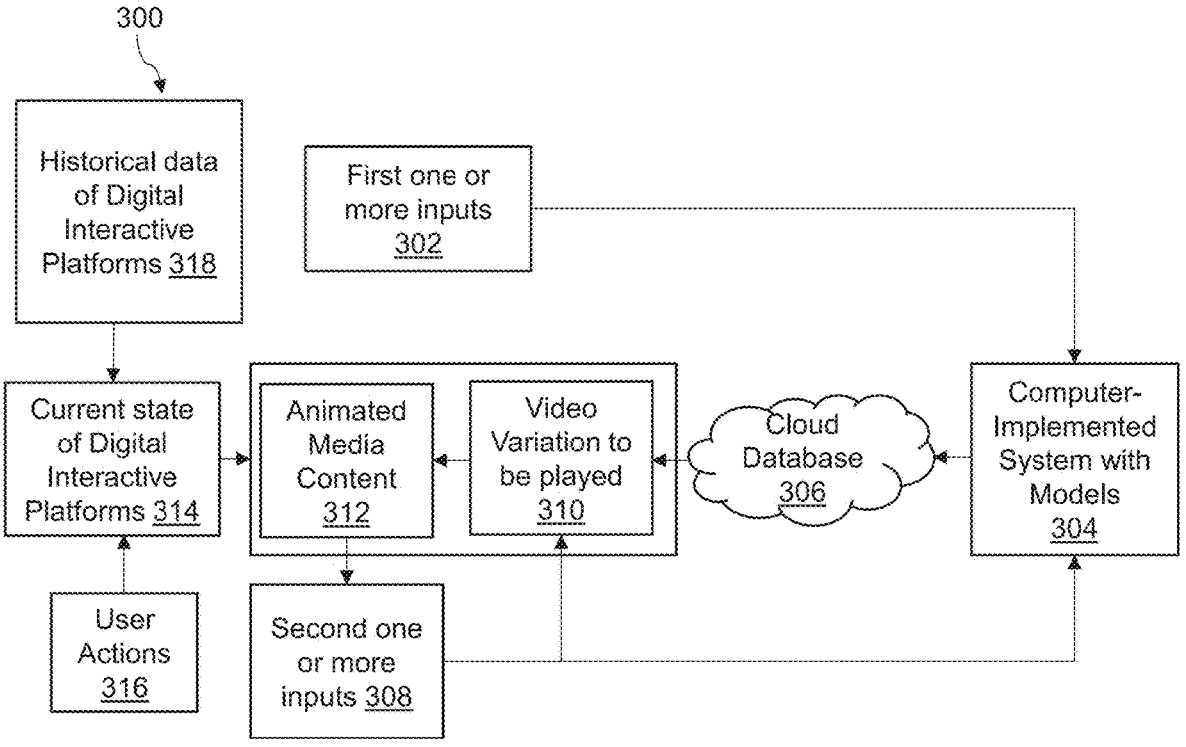
FIG. 3 is an overall process flow for generating the one or more video contents associated with the one or more digital interactive platforms to optimize the user experience in the one or more digital interactive platforms, such as those shown in FIG. 1, in accordance with an embodiment of the present disclosure.

FIG. 3 is an overall process flow 300 for generating the one or more video contents associated with the one or more digital interactive platforms to optimize the user experience in the one or more digital interactive platforms, such as those shown in FIG. 1, in accordance with an embodiment of the present disclosure. The first one or more inputs is obtained from one or more user devices 104 of the one or more users

102, as shown in step 302. In an embodiment, the first one or more inputs obtained from the one or more user devices 104 of the one or more users 102, includes the first infor-mation associated with at least one of: the selection of one or more characters in the one or more digital interactive platforms, and assigning of the one or more face expressions to each of the one or more characters in the one or more digital interactive platforms.

The computer-implemented system 106 with the machine learning model is configured to generate the one or more face expressions provided by the one or more characters, based on the first one or more inputs obtained from the one or more user devices 104 of the one or more users 102, as shown in step 304. In an embodiment, the first one or more inputs may be the input text associated with at least one of: the one or more face expressions and the one or more characters for assigning the one or more face expressions.

The one or more face expressions provided by the one or more characters is pre-stored in the cloud database, as shown in step 306. The second one or more inputs is obtained from the one or more user devices 104 of the one or more users 102, as shown in step 308. In an embodiment, the second one or more inputs includes the second information associated with the real-time feedback provided by the one or more users 102, on at least one of: one or more actions (shown in step 316) performed by the one or more users 102 during the one or more digital interactive platforms, and the current state of the one or more digital interactive platforms (shown in step 314).

The video variation to be played (shown in step 310) is generated in the one or more video contents to optimize the user experience in the one or more digital interactive plat-forms, based on the correlation between the real-time feed-back provided by the one or more users 102 (shown in step 308) on at least one of: the one or more actions performed by the one or more users 102 during the one or more digital interactive platforms and the current state of the one or more digital interactive platforms, and the one or more face expressions assigned to each of the one or more characters in the one or more digital interactive platforms. In an embodiment, the video variation may be played as the one or more animated media contents (shown in step 312).

In an embodiment, the at least one logical sub-event corresponding to the one or more events associated with one or more user actions, in the one or more video contents, based on historical data (shown in step 318) associated with the one or more digital interactive platforms.

FIG. 4 is a flow chart depicting a computer-implemented method 400 for generating the one or more video contents associated with the one or more digital interactive platforms to optimize the user experience in the one or more digital interactive platforms, in accordance with an embodiment of the present disclosure.

At step 402, the first one or more inputs is obtained from the one or more user devices 104 of one or more users 102. In an embodiment, the first one or more inputs obtained from the one or more user devices 104 of the one or more users 102, includes the first information associated with at least one of: the selection of one or more characters in the one or more digital interactive platforms, and assigning of the one or more face expressions to each of the one or more characters in the one or more digital interactive platforms.

At step 404, the one or more video contents associated with the one or more digital interactive platforms, is gen-erated.

At step 406, the second one or more inputs from the one or more user devices 104 of the one or more users 102 is obtained. In an embodiment, the second one or more inputs includes the second information associated with the real-time feedback provided by the one or more users 102, on at least one of: one or more actions performed by the one or more users 102 during the one or more digital interactive platforms, and a current state of the one or more digital interactive platforms.

At step 408, the real-time feedback provided by the one or more users 102 on at least one of: the one or more actions performed by the one or more users 102 during the one or more digital interactive platforms and the current state of the one or more digital interactive platforms, is correlated with the one or more face expressions assigned to each of the one or more characters in the one or more digital interactive platforms.

At step 410, the one or more animated media contents is generated in the one or more video contents to optimize the user experience in the one or more digital interactive platforms, based on the correlation between the real-time feedback provided by the one or more users 102 on at least one of: the one or more actions performed by the one or more users 102 during the one or more digital interactive platforms and the current state of the one or more digital interactive platforms, and the one or more face expressions assigned to each of the one or more characters in the one or more digital interactive platforms. In an embodiment, the one or more animated media contents includes at least one of: the one or more face expressions provided by the one or more characters and one or more scenes related to the one or more actions performed by the one or more users 102.

The present invention has following advantages. The present invention is configured to optimize the user experience in the one or more digital interactive platforms based on the personalization of the one or more video contents. The present invention has personalization options for the one or more users 102 to have maximized experience to guide the one or more users 102 for optional actions and to enhance direct engagement to enjoy the one or more digital interactive platforms.

The present invention is configured to increase a scalability of sports and presenters based on artificial intelligence and machine learning solutions rather than physical increase of people. The present invention helps in reducing cost and increasing savings by allowing seamless digital interactive platforms across 24/7 spectrum with real feel like and personalized sports presenters.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, an apparatus, or a device.

The medium can be an electronic, a magnetic, an optical, an electromagnetic, an infrared, or a semiconductor system (or an apparatus or a device) or a propagation medium. Examples of a computer-readable medium include a semiconductor or solid-state memory, a magnetic tape, a removable computer diskette, a random-access memory (RAM), a read-only memory (ROM), a rigid magnetic disk and an optical disk. Current examples of optical disks include a compact disk-read only memory (CD-ROM), a compact disk-read/write (CD-R/W) and a DVD.

Input/output (I/O) devices (including but not limited to keyboards, displays, pointing devices, and the like) can be coupled to the computer-implemented system 106 either directly or through intervening I/O controllers. Network adapters may also be coupled to the computer-implemented system 106 to enable a data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 106 in accordance with the embodiments herein. The computer-implemented system 106 herein comprises at least one of: a processor or a central processing unit (CPU). The CPUs are interconnected via the system bus 210 to various devices such as a random-access memory (RAM), read-only memory (ROM), and an input/output (I/O) adapter. The I/O adapter can connect to peripheral devices, such as disk units and tape drives, or other program storage devices that are readable by the computer-implemented system 106. The computer-implemented system 106 can read the inventive instructions on the program storage devices and follow these instructions to execute the methodology of the embodiments herein.

The computer-implemented system 106 further includes a user interface adapter that connects a keyboard, a mouse, a speaker, a microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, a printer, or a transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. Of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A computer-implemented system for generating one or more video contents associated with one or more digital interactive platforms to optimize a user experience in the one or more digital interactive platforms, the computer-implemented system comprising:

one or more hardware processors; and a memory coupled to the one or more hardware processors, wherein the memory comprises a set of program instructions in form of a plurality of subsystems, configured to be executed by the one or more hardware processors, wherein the plurality of subsystems comprises:

an input obtaining subsystem configured to obtain first one or more inputs from one or more user devices of one or more users, wherein the first one or more inputs obtained from the one or more user devices of the one or more users, comprises first information associated with at least one of: a selection of one or more characters in the one or more digital interactive platforms, and assigning of one or more face expressions to each of the one or more characters in the one or more digital interactive platforms;

a video content generating subsystem configured to generate the one or more video contents associated with the one or more digital interactive platforms;

the input obtaining subsystem further configured to obtain second one or more inputs from the one or more user devices of the one or more users, wherein the second one or more inputs comprises second information associated with a real-time feedback provided by the one or more users, on at least one of: one or more actions performed by the one or more users during the one or more digital interactive platforms, and a current state of the one or more digital interactive platforms; and the video content generating subsystem further configured to:

correlate the real-time feedback provided by the one or more users on at least one of: the one or more actions performed by the one or more users during the one or more digital interactive platforms and the current state of the one or more digital interactive platforms, with the one or more face expressions assigned to each of the one or more characters in the one or more digital interactive platforms; and generate one or more animated media contents in the one or more video contents to optimize the user experience in the one or more digital interactive platforms, based on the correlation between the real-time feedback provided by the one or more users on at least one of: the one or more actions performed by the one or more users during the one or more digital interactive platforms and the current state of the one or more digital interactive platforms, and the one or more face expressions assigned to each of the one or more characters in the one or more digital interactive platforms, wherein the one or more animated media contents comprises at least one of: the one or more face expressions provided by the one or more characters and one or more scenes related to the one or more actions performed by the one or more users.

2. The computer-implemented system as claimed in claim 1, wherein the second one or more inputs is obtained from at least one image capturing device configured in the one or more user devices of the one or more users.

3. The computer-implemented system as claimed in claim 1, wherein the one or more face expressions provided by the one or more characters is pre-stored in a cloud database, wherein the one or more face expressions provided by the one or more characters is generated as the one or more animated media contents by a machine learning model comprising at least one of: a video-to-video model and a text-to image-model, based on the first one or more inputs obtained from the one or more user devices of the one or more users, and wherein the one or more animated media contents comprises a sequence of images of the one or more characters with the one or more face expressions.

4. The computer-implemented system as claimed in claim 3, wherein in generating the one or more face expressions provided by the one or more characters, the machine learning model is configured to:

obtain the first one or more inputs from the one or more user devices of the one or more users, wherein the first one or more inputs comprises an input text associated with at least one of: the one or more face expressions and the one or more characters for assigning the one or more face expressions;

correlate the input text associated with at least one of: the one or more face expressions and the one or more characters to whom the one or more face expressions to be assigned, with predetermined one or more animated media contents associated with one or more face expressions provided by the one or more characters; and generate the one or more face expressions provided by the one or more characters, based on the correlation between the input text associated with at least one of: the one or more face expressions and the one or more characters to whom the one or more face expressions to be assigned, and the predetermined one or more animated media contents associated with the one or more face expressions provided by the one or more characters.

5. The computer-implemented system as claimed in claim 1, further comprising an event generating subsystem configured to generate at least one logical sub-event corresponding to one or more events associated with one or more user actions, in the one or more video contents, based on historical data associated with the one or more digital interactive platforms, wherein the at least one logical sub-event comprises the one or more animated media contents generated in the one or more video contents.

6. The computer-implemented system as claimed in claim 5, wherein the event generating subsystem is further configured to combine at least two sub-events corresponding to the one or more events associated with the one or more user actions, in the one or more video contents, and wherein the at least two logical sub-events being played upon occurring of the one or more events associated with the one or more actions performed by the one or more users, in the one or more video contents.

7. The computer-implemented system as claimed in claim 1, wherein the one or more face expressions comprises at least one of: happy, sad, angry, and surprise, provided by the one or more characters based on the real-time feedback provided by the one or more users on at least one of: the one or more actions performed by the one or more users during the one or more digital interactive platforms and the current state of the one or more digital interactive platforms.

8. A computer-implemented method for generating one or more video contents associated with one or more digital interactive platforms to optimize a user experience in the one or more digital interactive platforms, the computer-implemented method comprising:

obtaining, by one or more hardware processors, first one or more inputs from one or more user devices of one or more users, wherein the first one or more inputs obtained from the one or more user devices of the one or more users, comprises first information associated with at least one of: a selection of one or more characters in the one or more digital interactive platforms, and assigning of one or more face expressions to each of the one or more characters in the one or more digital interactive platforms;

generating, by the one or more hardware processors, the one or more video contents associated with the one or more digital interactive platforms;

obtaining, by the one or more hardware processors, second one or more inputs from the one or more user devices of the one or more users, wherein the second one or more inputs comprises second information associated with a real-time feedback provided by the one or more users, on at least one of: one or more actions performed by the one or more users during the one or more digital interactive platforms, and a current state of the one or more digital interactive platforms;

correlating, by the one or more hardware processors, the real-time feedback provided by the one or more users on at least one of: the one or more actions performed by the one or more users during the one or more digital interactive platforms and the current state of the one or more digital interactive platforms, with the one or more face expressions assigned to each of the one or more characters in the one or more digital interactive platforms; and generating, by the one or more hardware processors, one or more animated media contents in the one or more video contents to optimize the user experience in the one or more digital interactive platforms, based on the correlation between the real-time feedback provided by the one or more users on at least one of: the one or more actions performed by the one or more users during the one or more digital interactive platforms and the current state of the one or more digital interactive platforms, and the one or more face expressions assigned to each of the one or more characters in the one or more digital interactive platforms, wherein the one or more animated media contents comprises at least one of: the one or more face expressions provided by the one or more characters and one or more scenes related to the one or more actions performed by the one or more users.

9. The computer-implemented method as claimed in claim 8, wherein the second one or more inputs is obtained from at least one image capturing device configured in the one or more user devices of the one or more users.

10. The computer-implemented method as claimed in claim 8, wherein the one or more face expressions provided by the one or more characters is pre-stored in a cloud database, wherein the one or more face expressions provided by the one or more characters is generated as the one or more animated media contents by a machine learning model comprising at least one of: a video-to-video model and a text-to image-model, based on the first one or more inputs obtained from the one or more user devices of the one or more users, and wherein the one or more animated media contents comprises a sequence of images of the one or more characters with the one or more face expressions.

11. The computer-implemented method as claimed in claim 10, wherein generating, by the machine learning model, the one or more face expressions provided by the one or more characters, comprises:

obtaining, by the one or more hardware processors, the first one or more inputs from the one or more user devices of the one or more users, wherein the first one or more inputs comprises an input text associated with at least one of: the one or more face expressions and the one or more characters for assigning the one or more face expressions;

correlating, by the one or more hardware processors, the input text associated with at least one of: the one or more face expressions and the one or more characters to whom the one or more face expressions to be assigned, with predetermined one or more animated media contents associated with one or more face expressions provided by the one or more characters; and generating, by the one or more hardware processors, the one or more face expressions provided by the one or more characters, based on the correlation between the input text associated with at least one of: the one or more face expressions and the one or more characters to whom the one or more face expressions to be assigned, and the predetermined one or more animated media contents associated with the one or more face expressions provided by the one or more characters.

12. The computer-implemented method as claimed in claim 8, further comprising generating, by the one or more hardware processors, at least one logical sub-event corresponding to one or more events associated with one or more user actions, in the one or more video contents, based on historical data associated with the one or more digital interactive platforms, wherein the at least one logical sub-event comprises the animated media content generated in the one or more video contents.

13. The computer-implemented method as claimed in claim 12, further comprising combining, by the one or more hardware processors, at least two sub-events corresponding to the one or more events associated with the one or more user actions, in the one or more video contents, and wherein the at least two logical sub-events being played upon occurring of the one or more events associated with the one or more actions performed by the one or more users, in the one or more video contents.

14. The computer-implemented method as claimed in claim 8, wherein the one or more face expressions comprises at least one of: happy, sad, angry, and surprise, provided by the one or more characters based on the real-time feedback provided by the one or more users on at least one of: the one or more actions performed by the one or more users during the one or more digital interactive platforms and the current state of the one or more digital interactive platforms.

* * * * *